(12) United States Patent
Kerhuel et al.

(10) Patent No.: US 9,900,141 B2
(45) Date of Patent: Feb. 20, 2018

(54) METHOD AND APPARATUS FOR SNR ESTIMATION APPARATUS IN OFDM SYSTEMS

(71) Applicant: FREESCALE SEMICONDUCTOR, INC., Austin, TX (US)

(72) Inventors: Samuel Kerhuel, Villeneuve Tolosane (FR); Vincent Pierre Martinez, Castres (FR)

(73) Assignee: NXP USA, Inc., Austin, TX (US)

( * ) Notice: Subject to any disclaimer, the term of this patent is extended or adjusted under 35 U.S.C. 154(b) by 153 days.

(21) Appl. No.: 14/840,223

(22) Filed: Aug. 31, 2015

(65) Prior Publication Data
US 2016/0294456 A1    Oct. 6, 2016

(30) Foreign Application Priority Data

Mar. 30, 2015  (WO) .................. PCT/IB2015/000543

(51) Int. Cl.
*H04W 4/00* (2009.01)
*H04L 5/00* (2006.01)
(Continued)

(52) U.S. Cl.
CPC ........... *H04L 5/006* (2013.01); *H04B 17/336* (2015.01); *H04B 17/3912* (2015.01);
(Continued)

(58) Field of Classification Search
CPC ..................................................... H04L 5/006
See application file for complete search history.

(56) References Cited

U.S. PATENT DOCUMENTS 9,641,274 B2* 5/2017 Kerhuel .............. H04J 13/0062
2008/0039098 A1* 2/2008 Papasakellariou H04W 72/1231
455/442
(Continued)

FOREIGN PATENT DOCUMENTS

CN          102892138 A       1/2013
CN          103402249 A       11/2013

OTHER PUBLICATIONS

Dan Wang; Shizhong Yang; Yong Liao; Yu Liu, "Efficient Receiver Scheme for LTE PUCCH," Communications Letters, IEEE, vol. 16, No. 3, pp. 352,355, Mar. 2012.
(Continued)

*Primary Examiner* — Gerald Smarth

(57) ABSTRACT

A receiving apparatus for SNR estimation of a signal such as the LTE PUCCH, transmitted over a channel of an OFDM wireless communication system.
The proposed apparatus brings determines the noise power level in the frequency domain based on a noise covariance matrix where timing errors are back compensated in the equation since timing error is expressed a complex exponential therein. Contrary to the common methods used for determining the noise power level, in the present invention deriving the channel estimate components from the pilot symbol(s) comprised in the received signal is not required. Based on the present invention, user's transmit power is reduced thereby improving battery power longevity. Further, since interference is reduced, more users may be multiplexed together in the same resources.
A method and a computer program product are also claimed.

20 Claims, 3 Drawing Sheets

(51) Int. Cl.
  *H04B 17/336* (2015.01)
  *H04B 17/391* (2015.01)
  *H04J 11/00* (2006.01)
  *H04L 1/20* (2006.01)
  *H04L 27/26* (2006.01)
  *H04J 13/00* (2011.01)

(52) U.S. Cl.
  CPC ............ *H04J 11/0046* (2013.01); *H04L 1/20* (2013.01); *H04L 27/2613* (2013.01); *H04L 27/2647* (2013.01); *H04J 13/0062* (2013.01); *H04L 5/0048* (2013.01)

(56) References Cited

U.S. PATENT DOCUMENTS

2008/0268857 A1* 10/2008 McCoy ................. H04W 24/10
                                                    455/447
2011/0244905 A1    10/2011 Burstrom et al.
2016/0173248 A1*  6/2016 Kerhuel ................... H04L 5/00
                                                    370/328

OTHER PUBLICATIONS

Wang, W. and Ren, G. (2013) Multiuser Receiver Scheme with SIC for PUCCH in High Speed Train Environment. Communications and Network, 5, p. 308-311. doi: 10.4236/cn.2013.53B2057.

* cited by examiner

METHOD AND APPARATUS FOR SNR ESTIMATION APPARATUS IN OFDM SYSTEMS

CROSS REFERENCE TO RELATED APPLICATION(S)

The present application claims priority to International Patent Application No. PCT/IB2015/000543, entitled "METHOD AND APPARATUS FOR SNR ESTIMATION APPARATUS IN OFDM SYSTEMS," filed on Mar. 30, 2015, the entirety of which is herein incorporated by reference.

FIELD OF THE INVENTION

This invention relates to a receiving apparatus, a method and a computer program for SNR estimation of a signal in OFDM systems.

BACKGROUND OF THE INVENTION

In Long-Term Evolution (LTE) by the $3^{rd}$ Generation Partnership Project, the Radio Access Network is optimized for packet-oriented applications with low latency and high-peak rates. In order to guarantee that the packets are correctly delivered to the upper layers, LTE employs a combination of Automatic Repeat Request and Forward Error Correction, also known as Hybrid-ARQ, which must be fed back to a base station. In the uplink, the uplink control channel called the physical uplink control channel (PUCCH) is associated with the transmission of Channel Quality Indicators, Hybrid-ARQ acknowledgements and scheduling requests. Within the PUCCH, multiple User Equipments can share the same time-frequency resources, the User Equipments being multiplexed via Code Division Multiplexing in the frequency domain and in the time domain, simultaneously. For Channel Quality Indicators information, for instance, Code Division Multiplexing is achieved by cyclically shifting a code exhibiting Constant Amplitude Zero Autocorrelation property. This is based on the fact that cross-correlation is null among cyclically shifted Constant Amplitude Zero Autocorrelation codes.

LTE PUCCH determines a signal to noise ratio (SNR) or Signal to Interference-plus-Noise Ratio (SINR) associated with each User Equipment. LTE PUCCH SNR or SINR may then be used as a reference value during power control procedure. Accurate estimation of the SNR/SINR ensures that each User Equipment can appropriately adjust its transmitting power so as not to unduly generate interference over other User Equipments and also avoids unduly wasting battery power. LTE specifications do not specify how LTE PUCCH SNR/SINR should be determined. Conventional methods usually determine separately the noise power level and the signal power level associated with each UE, each being derived based on estimates of the channel over which the LTE PUCCH signal was transmitted. Unfortunately, such methods tend to be inaccurate where timing errors are experienced due to the fact that orthogonality between CAZAC codes is often lost in Orthogonal Frequency Division Multiplexing (OFDM) systems such as LTE. In such cases, timing errors can cause a linearly growing phase error within OFDM symbols which ultimately impair the accuracy of the LTE PUCCH SNR.

This situation is problematic, mostly where several User Equipments are piggy-backed by the PUCCH, since the combination of a plurality of timing errors has the effect of limiting the capacity of the PUCCH carrying more User Equipments at the same time.

Therefore, it would be desirable to have a solution that would determine the PUCCH SNR/SINR without suffering from the negative impact of the timing errors.

SUMMARY OF THE INVENTION

The present invention provides an OFDM receiving apparatus, a method and a computer program for SNR estimation of an incoming signal in wireless communication systems, as described in the accompanying claims. Specific embodiments of the invention are set forth in the dependent claims. These and other aspects of the invention will be apparent from an elucidated with reference to the embodiments described hereinafter.

BRIEF DESCRIPTION OF THE DRAWINGS

Further details, aspects and embodiments of the present invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

In order to solve the problem of determining the PUCCH SNR without suffering from the negative impact of the timing errors, embodiments of the present invention determine the SNR without relying solely on the channel estimate components. To that end, as in conventional methods, noise power level and UE's signal power level are calculated separately. But in embodiments of the present invention, the noise power level is determined in the frequency domain based on a noise and interference covariance matrix. This way, the SNR determination is less sensitive to timing errors since the noise and interference matrix is resilient to timing errors.

For the sake of understanding of the present invention, the following detailed description will focus on the decoding of a Long-Term Evolution (LTE) Physical Uplink Control Channel (PUCCH) signal in its format 2. But, a person of ordinary skill in the art of communication systems will readily appreciate that the present invention may also apply to all other formats supported by LTE PUCCH signal such as 2a/2b or 1/1a/1b and other OFDM communication channels different from the LTE PUCCH, at the receiver level, where those others communication systems and others channels exhibit the same characteristics as those described in the following description.

Figure 1:
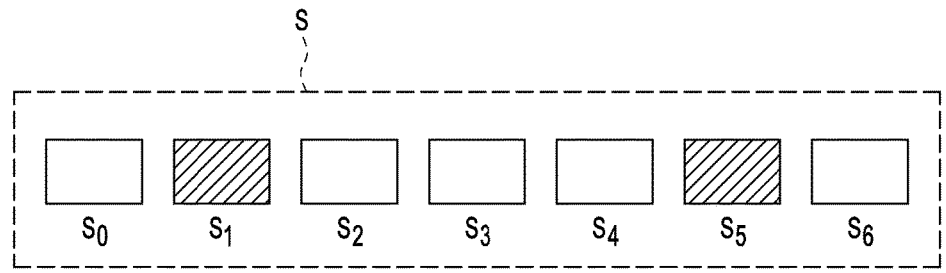
FIG. 1 is a schematic diagram of an exemplary time-domain signal transmitted by a LTE PUCCH transmitter.

FIG. 1 illustrates an exemplary incoming LTE PUCCH signal S which includes a plurality of symbols $s_0$, $s_1$, $s_2$, $s_3$, $s_4$, $S_5$, $s_6$. The incoming LTE PUCCH signal S of FIG. 1 includes five data symbols $s_0$, $s_2$, $s_3$, $s_4$, $s_6$ and two pilot symbols $s_1$, $s_5$. But, for the sake of simplicity and clarity, only one data symbol and one pilot symbol would be considered in the incoming LTE PUCCH signal, in the following description. It should be understood that the teachings of the present invention can be used for more than one data symbol or pilot symbol. Further, it is to be noted that each of the data and pilot symbols of the incoming LTE PUCCH signal are orthogonally multiplexed in the time domain with a unique cyclically shifted version of a code exhibiting constant-amplitude zero autocorrelation (CAZAC) property in the frequency domain, when perfectly time-synchronized. In the following description, it will be also considered that four user associated information are carried by the incoming LTE PUCCH signal, where the term 'user' means a user of a remote User Equipment (UE) of the LTE communication system through, which is configured to generate transmission signals. It should be understood that the teachings of the present invention can be used for more than or less than four user associated information.

A signal to noise ratio (SNR) measurement is determined in a conventional LTE receiver as follows. Basically, conventional methods usually determine separately the noise power level and the signal power level associated with each UE, each being derived based on estimates of the channel over which the incoming LTE PUCCH signal was transmitted. In a first step, the signal power level is determined based on the associated channel estimate component obtained from a conventional channel estimator. For instance, the signal power level associated with a user UE1 may be obtained according to the following equation (1):

$$P_{UE1} = |CE_{UE1}|$$

where, $P_{UE1}$ is the signal power level associated with the user UE1;

$CE_{UE1}$ is the channel estimate component associated with the user UE1 which is obtained by a conventional channel estimator, for instance; and, $|\cdot|$ is the norm operator.

Later, in a second step, the noise power level is determined based on all the channel estimate components obtained from the conventional channel estimator and the signal received by the conventional LTE receiver. For instance, the noise power level may be obtained using a Successive Interference Cancellation (SIC) approach where the signal power contribution of each UE is removed from the signal received by the conventional LTE receiver in order to solely keep the remaining noise power level. Determination of the noise power level using a SIC approach is usually performed at the level of each antenna of the conventional LTE receiver, which results are later combined together using for instance MRC (Maximum Ratio Combining).

To summarise, conventional methods determine the SNR using the channel estimate components. Unfortunately, as already stated above, such methods tend to be inaccurate where timing errors are experienced due to the fact that orthogonally between CAZAC codes is often lost in OFDM systems such as LTE. In such cases, timing errors can cause a linearly growing phase error within OFDM symbols which ultimately impairs the accuracy of the LTE PUCCH SNR.

In order to solve the above-mentioned problem, embodiments of the present invention determine the SNR without relying solely on the channel estimate components. To that end, as in conventional methods, noise power level and UE's signal power level are calculated separately. But the noise power level is determined in the frequency domain based on a noise and interference covariance matrix. This way, the SNR determination is less sensitive to timing errors since the noise and interference matrix is resilient to timing errors.

Figure 2:
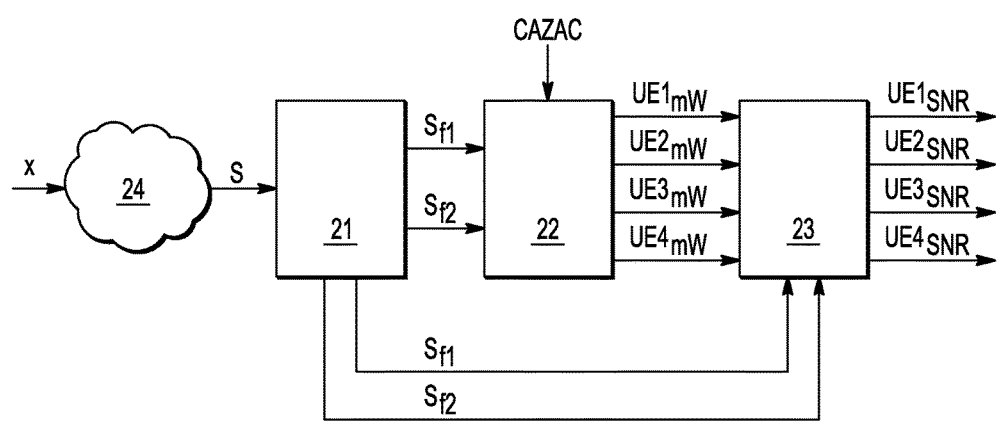
FIG. 2 is an exemplary wireless reception chain including a receiving apparatus according to embodiments of the present invention.

Referring now to FIG. 2, there is diagrammatically shown therein an exemplary OFDM receiving apparatus 20 in accordance with embodiments of the present invention. In FIG. 2, the receiving apparatus includes:

a receiving unit such as a Radio Frequency (RF) receiver 21 similar to those normally encountered in OFDM communication systems, including a plurality of receiving antennas (not shown), which is configured to receive an incoming LTE PUCCH signal S transmitted over a channel 24 of a wireless communication system. For example, the channel 24 may have a bandwidth such as 6 MHz, 10 MHz, 20 MHz or 40 MHz. Receiving unit 21 is configured to convert the incoming LTE PUCCH signal S received on the plurality of antennas into respective plurality of frequency domain signals;

a signal power measuring unit 22 similar to those normally encountered in OFDM communication systems. The signal power measuring unit 22 is configured to measure the signal power level associated with each user based on the associated CAZAC code and the plurality of frequency-domain signals; and, a processing unit such as a processor 23.

In FIG. 2, the receiving unit 21 is coupled to the signal power measuring unit 22, the latter being coupled to the processing unit 23. The receiving unit 21 and the processing unit 23 are configured to perform matrix operations over vectors and matrices. In the following, it will be considered that the receiving unit 21 includes two receiving antennas (not shown). But, the teachings of the present invention can be used for more antennas comprised in the receiving unit 21.

Receiving unit 21 includes:

a cyclic prefix removing unit (not shown) such as a signal processing unit, configured to remove a cyclic prefix from symbol (s) of the received LTE PUCCH signal S; and, a Fast-Fourier Transform (FFT) and resource demapping unit (not shown) such as a FFT transformer, configured to generate a received pilot frequency-domain signal based on the pilot symbol of the LTE PUCCH signal S with cyclic prefix removed.

In the example of FIG. 2, after a LTE PUCCH signal x has passed through the communication channel 24, a LTE PUCCH signal S including at least one data symbol and at least one pilot symbol is received at the plurality of antennas of the receiving unit 21. As already explained above, each symbol multiplexes user associated information based on CAZAC codes so as to enable a plurality of user associated information of respective UEs to be transmitted at the same time. The receiving unit 21 generates a plurality of frequency-domain signals $S_{f1}$, $S_{f2}$ based on the incoming LTE PUCCH signal S, wherein the index f stands for the frequency domain. $S_{f1}$ relates to the frequency-domain signal received on the first antenna (not shown) and $S_{f2}$ relates to the frequency-domain signal received on the second antenna (not shown).

Signal power measuring unit 22 generates a measure of the signal power level associated with each user $UE1_{mW}$, $UE2_{mW}$, $UE3_{mW}$, $UE4_{mW}$. In FIG. 2, the exemplary signal power levels are represented in milliwatts (mW). But, the teachings of the present invention can be used as well for other units such as, in milliwatt decibels (dBm), for instance.

Processing unit 23 generates a noise and interference covariance matrix by producing a matrix representation of correlation between the signals received at the plurality of receiving antennas of the receiving unit 21, which are comprised in the plurality of frequency-domain signals $S_{f1}$, $S_{f2}$, as already explained above. The processing unit 23 calculates the covariance matrix of a noise-and-interference signal. The noise-and-interference signal includes a noise component and an interference component derived from the plurality of frequency-domain signals $S_{f1}$, $S_{f2}$.

The processing unit 23 is further configured to process the plurality of frequency-domain signals $S_{f1}$, $S_{f2}$ so as to identify the separate noise and/or interference components from other components. The noise-and-interference signal can be received on the one or more receiving antennas of the receiving unit 21 such that the noise-and-interference signal can include multiple sub-signals, each sub-signal corresponding to a single antenna.

The noise and interference covariance matrix can be estimated using a number of suitable methods. In one embodiment, the noise and interference covariance matrix includes diagonal elements that hold a combination of noise and interference power level received on each antenna of the receiving unit 21 (i.e., the sum of Noise, Interference and Useful signals). Further, off-diagonal elements of the noise and interference covariance matrix comprise the interference power level received on all antennas of the receiving unit 21 (i.e., the sum of Interference and Useful signals). The noise and interference covariance matrix can be summarized by the following equation (2), for a given symbol:

$$C_{i,j} = \sum_{s=1}^{p} N_{i,s} \times \overline{N_{j,s}}$$

where,
C is the covariance matrix;
N is the noise;
i and j are antennas indexes;
s is the subcarrier index;
p is the maximum of subcarrier in a resource element; and,
$\overline{(\cdot)}$ is the conjugate operator. In the example of LTE PUCCH, the equation (2) is applied to one PUCCH allocation at a time (i.e., one resource block which is made of twelve subcarriers).

An example of such noise and interference covariance matrix, for two receiving antennas of the receiving unit 21, is represented following equation (3):

$$C = \begin{bmatrix} |A_1 \times \overline{A_1}| & |A_2 \times \overline{A_1}| \\ |A_1 \times \overline{A_2}| & |A_2 \times \overline{A_2}| \end{bmatrix} = \begin{bmatrix} |A_1|^2 & |A_2 \times \overline{A_1}| \\ |A_1 \times \overline{A_2}| & |A_2|^2 \end{bmatrix}$$

where,
C is the covariance matrix, as already explained above with regard to equation (2);
$A_1$ is the frequency-domain signals $S_{f1}$;
$A_2$ is the frequency-domain signals $S_{f2}$;
$\overline{(\cdot)}$ is the conjugate operator; and,
|•| is the norm operator.

In the above-mentioned example of noise and interference covariance matrix, $|A_1|^2$ corresponds to the combination of noise and interference power level received on a first antenna of the receiving unit 21 (i.e., the sum of Noise, Interference and Useful signals);
$|A_2|^2$ corresponds to the combination of noise and interference power level received on a second antenna of the receiving unit 21 (i.e., the sum of Noise, Interference and Useful signals); and,
$|A_1 \times \overline{A_2}|$ and $|A_2 \times \overline{A_1}|$ correspond to the interference power level received on the first and second antennas of the receiving unit 21 (i.e., the sum of Interference and Useful signals).

Further, the processing unit 23 is configured to determine a noise power level of the channel 24 based on the noise and interference covariance matrix. The noise power level is obtained by a subtraction operation between the diagonal elements and the off-diagonal elements, that is, between the combination of noise and interference and the interference power levels.

For example, the noise and interference (NI) power level (i.e., diagonal elements of equation (2)) can be determined following equation (4):

$$NI = \sum_{a=0}^{N_{ant}-1} |C_{a,a}|$$

where,
$N_{ant}$ is the number of antennas comprised in the receiving unit 21;
a is an antenna index;
C is the noise and interference covariance matrix, as already explained above with regard to equation (2); and,
|•| is the norm operator.

Further, the interference (I) power level (i.e., off-diagonal elements of equation (2)) can be determined following equation (5):

$$I = \sum_{l=0}^{N_{ant}-1} \sum_{m=l}^{N_{ant}-1} |C_{l,m}|$$

where,
$N_{ant}$ is the number of antennas comprised in the receiving unit 21;
l and m are antennas indexes;
C is the noise and interference covariance matrix, as already explained above with regard to equation (2); and,
|•| is the norm operator.

Then, based on equations (4) and (5), the noise power level (N) can be determined following equation (6):

$$N = NI - I$$

It can be readily noticed by a person of ordinary skill, that the noise power level N obtained as explained above, does not necessitate the determination nor the use of the channel estimate components. In that case, the obtained noise power level N of the subject-application is not impaired by timing errors since timing errors are back compensated in the calculation of the noise and interference covariance matrix where timing error is expressed as a complex exponential. Therefore, a person of ordinary skill would also readily understand that determining a SNR based on the proposed noise power level N would lead to a SNR which is less subject to accuracy problems due to timing errors.

Processing unit 23 is also configured to determine the SNR associated with each UE by dividing the associated measured signal power level by the determined noise power level. In an example, the SNR is obtained following equation (7):

$$SNR = 10 \times \log_{10}\left(\frac{P_{UE}}{N}\right)$$

where, $P_{UE}$ is the signal power level associated with a user UE, as already explained above with regard to equation (1);

N is the noise and interference covariance matrix, as already explained above with regard to equation (6); and, $\log_{10}(\cdot)$ is the logarithm base 10 operator.

In one embodiment, the processing unit 23 is configured to determine a Signal to Interference-plus-Noise Ratio (SINR) associated with each UE by dividing the associated measured signal power level by a sum between the noise power level and the sum of the signal power level associated with the remaining UEs, excluding the signal power level of the user under concern. In an example, the sum of the signal power level associated with the remaining UEs where user UE is under concern, is obtained following equation (8):

$$I_{UE} = I - P_{UE}$$

where, $P_{UE}$ is the signal power level associated with a user UE, as already explained above with regard to equation (1); and, $I_{UE}$ is the interference power level associated with user UE, as already explained above with regard to equation (5).

Therefore, in an example, the SINR is obtained following equation (9):

$$SINR = 10 \times \log_{10}\left(\frac{P_{UE}}{N + I_{UE}}\right)$$

where, $P_{UE}$ is the signal power level associated with a user UE, as already explained above with regard to equation (1);

N is the noise and interference covariance matrix, as already explained above with regard to equation (6);

$I_{UE}$ is sum of the signal power level associated with the remaining UEs, excluding the signal power level of the user UE, as already explained above with regard to equation (8); and, $\log_{10}(\cdot)$ is the logarithm base 10 operator.

In another embodiment the processing unit 23 is configured to perform a power control procedure of a remote User Equipment (UE) of a wireless communication system based on said SNR or SINR used as a reference value.

Figure 3:
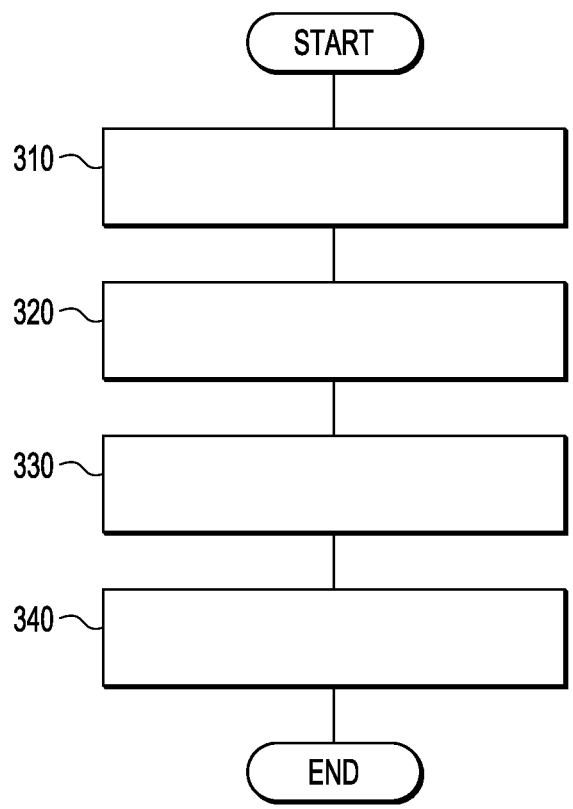
FIG. 3 is a schematic flow diagram of a method of SNR estimation according to an embodiment of the present invention.

Referring to FIG. 3, there is diagrammatically shown therein a schematic flow diagram of a method of estimating a SNR of a signal according to an embodiment of the present invention, where the signal is transmitted over a channel of an OFDM wireless communication system. The signal includes at least one data symbol and at least one pilot symbol, wherein each symbol of the received signal includes user associated information which are orthogonally multiplexed in the frequency domain with a unique cyclically shifted version of a known code exhibiting constant-amplitude zero autocorrelation, CAZAC, property.

In S310, an incoming signal is received by receiving unit 21, as explained above. In S320, the signal power level associated with each user is measured by the signal power measuring unit, as explained above. In 330, a noise power level of the channel is obtained in the frequency domain, based on a matrix representation of correlation between the plurality of incoming signals received at the receiving unit 21, as explained above. Finally, in S340, the SNR associated with each user is obtained by dividing the associated measured signal power level by the determined noise power level.

In an embodiment of the method, a power control procedure of a remote User Equipment (UE) of a wireless communication system is performed based on said SNR used as a reference value.

Embodiments of the present invention remove the need to rely solely on the channel estimate components in order to determine the SNR associated with a given user (i.e., UE). This is achieved by separately determining the noise power level in the frequency domain based on a noise covariance matrix according to which timing errors are back compensated. Indeed, in the equation of the noise and interference covariance matrix, timing error is expressed as a complex exponential. Therefore, while determining the noise power level, a multiplication operation between the timing error and the conjugate of the timing error results in nullifying the impact of the timing error. Contrary to the common methods used for determining the noise power level, in the present invention, deriving the channel estimate components from the pilot symbol(s) comprised in the received signal is not required. Indeed, no assumption is made with regard to the structure of the received signal since the noise power level is determined by considering the received signal as a whole directly at the level of the receiving antennas. Therefore, with embodiments of the present invention, more symbols can be considered (i.e., pilot and data symbols) in order to determine the noise power level in comparison with the methods which have been described above where only pilot symbols were considered.

Other methods which use both the data and the pilot symbol(s) in order to determine the channel estimate components are known. But such methods rely on a perfect decoding of the data symbols, which is not totally guaranteed. Therefore, such methods provide inaccurate results if the data symbols are incorrectly decoded. Such a drawback is not experienced in the present invention, since decoding the data symbols in order to determine the noise power level is not required.

Using embodiments of the present invention, a user's transmit power is reduced, thereby improving battery power longevity. Further, since interference is reduced, more users can be multiplexed together in the same resources. Namely, in the example of LTE PUCCH, more PUCCH users may be multiplexed within the same resource block (RB).

Figure 4:
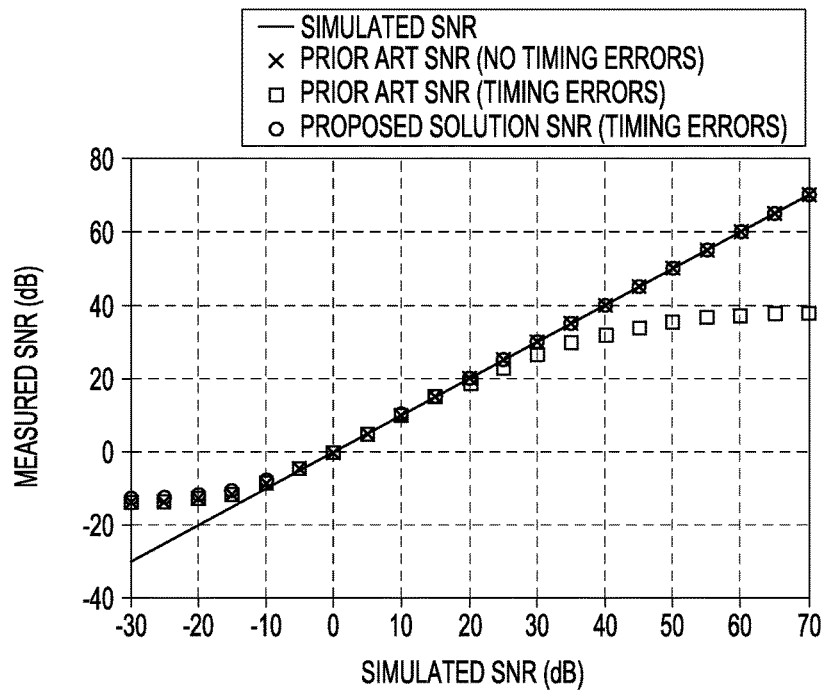
FIGS. 4 and 5 are exemplary plots of a simulated SNR versus measured SNRs, wherein one method of measuring the SNR is determined according to an embodiment of the present invention.
Figure 5:
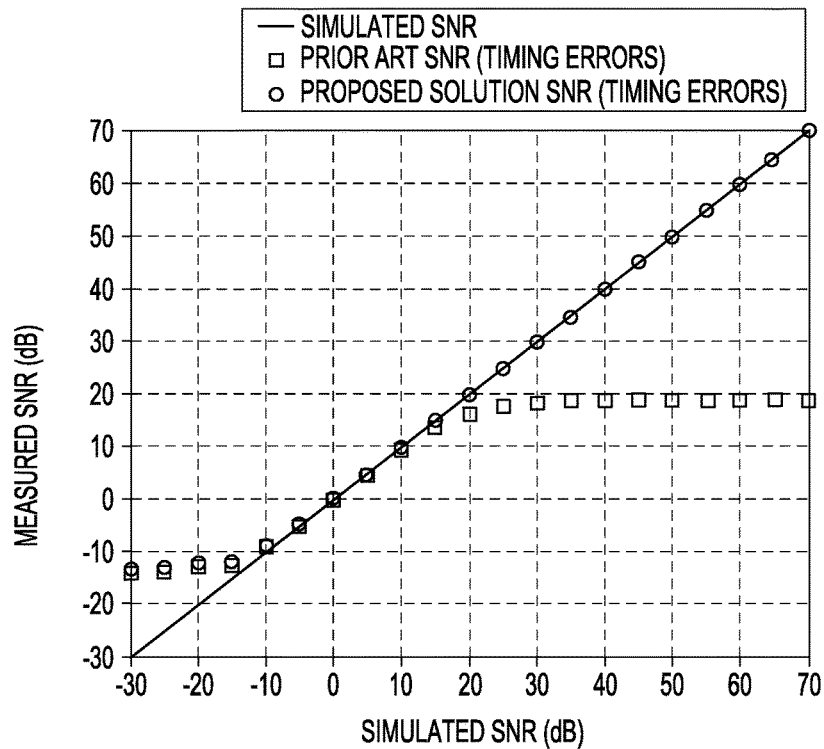

For the sake of completeness, simulations have been made in order to assess the improvements brought by the present invention. Results of such simulations, which have been averaged over a significant number of simulations results, are shown in FIG. 4 and FIG. 5. The simulation environment used FIG. 4 is defined as follows:

one UE is considered in a given symbol;

a timing error is generated following a random distribution with a maximum timing error of 0.52 μs; and, an additive white Gaussian noise (AWGN) propagation channel is used.

In the exemplary simulation results of FIG. 4, the x-axis shows simulated SNRs and the y-axis shows measured SNRs. Further in FIG. 4, there is shown:
- a straight line (-) illustrating simulated SNRs;
- cross markers (X) illustrating measured SNRs obtained according to a prior art method relying solely on the channel estimate component as already described above and where no timing error has been generated;
- square markers (□) illustrating measured SNRs obtained according to a prior art method relying solely on the channel estimate component as already described above and where timing errors have been generated; and,
- circle markers (○) illustrating measured SNRs obtained according to an embodiment of the present invention, where timing errors have been generated.

As can be seen from FIG. 4, the prior art solution illustrated by the square markers (□) deviates from the simulated SNRs at low and high SNRs. In both case this is problematic. Indeed, at high SNRs, the prior art method tend to underestimate the SNR, which may have a huge impact on the capacity of the LTE PUCCH signal. For instance, in FIG. 4, the prior art method provides a SNR measurement of about 40 dB while the simulated SNR (i.e., expected SNR) is around 60 dB. This has the effect that more power than should be required is used for UEs in such case. In contrast, the SNRs measured based on embodiments of the present invention behave in a similar manner as the SNR measured based on the prior art solution where timing error is not experienced and which is illustrated by the cross marker (X). Namely, at high SNRs the present invention perfectly matches the simulated SNRs while at low SNRs, deviation from the simulated SNRs is experienced. Hence, at high SNRs, the present invention brings improvements over the prior art method where timing error is experienced. This is understandable, because at high SNRs timing errors have a significant impact over the noise power level. Indeed, at high SNRs, little background noise is experienced. Hence, at high SNRs, embodiments of the present invention outperform the prior art methods because it does not rely upon the channel estimate components which can be easily impaired by such timing errors.

The simulation environment used FIG. 5 is defined as follows:
- eight UE are considered in a given symbol;
- a timing error is generated following a random distribution with a maximum timing error of 0.52 µs; and,
- an additive white Gaussian noise (AWGN) propagation channel is used.

In the exemplary simulation results of FIG. 5, the x-axis shows simulated SNRs and the y-axis shows measured SNRs. Further in FIG. 5, there is shown:
- a straight line (-) illustrating simulated SNRs;
- a square marker (□) illustrating measured SNRs obtained according to a prior art method relying solely on the channel estimate component as already described above, where timing errors have been generated; and,
- a circle marker (○) illustrating measured SNRs obtained according to an embodiment of the present invention, where timing errors have been generated.

As can be seen from FIG. 5, the prior art solution illustrated by the square marker (□) deviates from the simulated SNRs at low, moderate and high SNRs. In contrast, the present invention deviates from the simulated SNRs at low but perfectly matches the simulated SNRs at moderate and high SNRs. Hence, at moderate and high SNRs, the present invention brings improvement over the prior art method where timing error is experienced and where a plurality of users is considered. Therefore, the present invention outperforms the prior art methods because it does not rely upon the channel estimate components which can be easily impaired by such timing errors.

This is of important where a plurality of users are considered since this means that more users can be multiplexed together at a given SNR level where in the prior art fewer users would have been multiplexed together due to the SNR being considered as being problematic at the same SNR level. Indeed, in FIG. 5, it can be seen for instance that for a simulated SNR of 40 dB, in the prior art provides a SNR of about 20 dB, while the present invention provides a SNR of about 40 dB. Further, by being able to multiplex more users in a slot for a given SNR in comparison with the prior art, each user is able to reduce the needed transmission power thereby improving battery power longevity.

The present invention may also be implemented in a computer program product stored in a non-transitory computer-readable storage medium that stores computer-executable code for estimating a Signal to Noise Ratio (SNR) or a Signal to Interference-plus-Noise Ratio (SINR) of an incoming signal. The computer-executable code is further configured to perform a power control procedure of a remote User Equipment (UE) of a wireless communication system based on said SNR or SINR used as a reference value.

A computer program product is a list of instructions such as a particular application program and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory unit storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, multipoint-to-point telecommunication equipment and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as an operation to users and programs of the system.

The computer system may for example include at least one processing unit, associated memory unit and a number of input/output (I/O) devices. When executing the computer program, the computer system processes information according to the computer program and produces resultant output information via I/O devices.

In the description, the present invention has been described with reference to specific examples of embodiments of the present invention. It will, however, be evident that various modifications and changes may be made therein without departing from the broader scope of the present invention as set forth in the appended claims. For instance, the determination of the noise and interference covariance matrix can be determined by a dedicated unit instead of being performed by the processing unit. In that case, the dedicated unit is coupled to the processing unit and/or to the receiving unit. Further, although the LTE radio communications system is described as an example in the above-mentioned exemplary embodiment, the present invention is not limited to LTE radio communications systems but also can be applied other radio communications systems that include a plurality of receiving antennas.

A person of ordinary skill in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "connected," or "coupled," to each other to achieve the desired functionality.

Furthermore, a person of ordinary skill in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the present invention is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

But, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'including' does not exclude the presence of other elements or operations then those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An OFDM receiving apparatus for estimating a Signal to Noise Ratio (SNR) of an incoming signal, the apparatus comprising:
   a receiving unit comprising a plurality of antennas and configured to receive and convert said incoming signal into respective plurality of frequency-domain signals, said incoming signal,
   being transmitted over a channel of a wireless communication system, and
      comprising at least one data symbol and at least one pilot symbol, wherein each symbol of the received signal comprises information associated with a user of a remote device of said wireless communication system, which are orthogonally multiplexed in the frequency domain with a unique cyclically shifted version of a known code exhibiting constant- amplitude zero autocorrelation (CAZAC) property;
   a signal power measuring unit coupled to the receiving unit and configured to measure the signal power level associated with each user based on the associated CAZAC code and the plurality of frequency-domain signals; and
   a processing unit coupled to the receiving unit and the signal power measuring unit,
      wherein the processing unit is configured to
      produce a noise and interference covariance matrix of correlation between the plurality of frequency-domain signals received at the plurality of antennas,
      determine a noise power level of the channel based on the noise and interference covariance matrix, and
      determine the SNR associated with each user by dividing the associated measured signal power level by the determined noise power level.

2. The receiving apparatus of claim 1, wherein the processing unit is further configured to:
   determine a Signal to Interference-plus-Noise Ratio (SINR) associated with each user by dividing the associated measured signal power level by a sum between the noise power level and the sum of the signal power level associated with the remaining users excluding the signal power level of the user under concern.

3. The receiving apparatus of claim 1 wherein the noise and interference covariance matrix comprises:
diagonal elements which hold a combination of noise and interference power level received on each of the plurality of receiving antennas; and
off-diagonal elements which hold the interference power level received on all of the plurality of receiving antennas.

4. The receiving apparatus of claim 3 wherein the processing unit is configured to:
determine the noise power level by a subtraction operation between the diagonal elements and the off-diagonal elements of the noise and interference covariance matrix.

5. The receiving apparatus of claim 1 wherein the CAZAC code is a Zadoff-Chu sequence.

6. The receiving apparatus of claim 5 wherein the channel is a LTE Physical Uplink Control Channel (PUCCH).

7. The receiving apparatus of claim 1 wherein the processing unit is configured to:
performing a power control procedure of the remote device of said wireless communication system based on said SNR used as a reference value.

8. A method of estimating a Signal to Noise Ratio (SNR) of an incoming signal, the method comprising:
receiving through a plurality of antennas and converting said incoming signal into respective plurality of frequency-domain signals, said incoming signal, being transmitted over a channel of a wireless communication system, and
comprising at least one data symbol and at least one pilot symbol, wherein each symbol of the received signal comprises information associated with a user of a remote device of said wireless communication system which are orthogonally multiplexed in the frequency domain with a unique cyclically shifted version of a known code exhibiting constant-amplitude zero autocorrelation (CAZAC) property;
measuring the signal power level associated with each user based on the associated CAZAC code and the plurality of frequency-domain signals;
producing a noise and interference covariance matrix of correlation between the plurality of frequency-domain signals received at the plurality of antennas;
determining a noise power level of the channel based on the noise and interference covariance matrix; and
determining the SNR associated with each user by dividing the associated measured signal power level by the determined noise power level.

9. The method of claim 8, further comprising:
determining a Signal to Interference-plus-Noise Ratio (SINR) associated with each user by dividing the associated measured signal power level by a sum between the noise power level and the sum of the signal power level associated with the remaining users excluding the signal power level of the user under concern.

10. The method of claim 8 wherein the noise and interference covariance matrix comprises:
diagonal elements which hold a combination of noise and interference power level received on each of the plurality of receiving antennas; and
off-diagonal elements which hold the interference power level received on all of the plurality of receiving antennas.

11. The method of claim 10, further comprising:
determining the noise power level by a subtraction operation between the diagonal elements and the off-diagonal elements of the noise and interference covariance matrix.

12. The method of claim 8 wherein the CAZAC code is a Zadoff-Chu sequence.

13. The method of claim 12 wherein the channel is a LTE Physical Uplink Control Channel (PUCCH).

14. The method of claim 8, further comprising:
performing a power control procedure of the remote device of said wireless communication system based on said SNR used as a reference value.

15. A computer program product stored in a non-transitory computer-readable storage medium that stores computer-executable code for estimating a Signal to Noise Ratio (SNR) of an incoming signal, the computer-executable code causing a processor computer to perform actions comprising:
receiving through a plurality of antennas and converting said incoming signal into respective plurality of frequency-domain signals, said incoming signal,
being transmitted over a channel of a wireless communication system, and
comprising at least one data symbol and at least one pilot symbol, wherein each symbol of the received signal comprises information associated with a user of a remote device of said wireless communication system which are orthogonally multiplexed in the frequency domain with a unique cyclically shifted version of a known code exhibiting constant-amplitude zero autocorrelation (CAZAC) property;
measuring the signal power level associated with each user based on the associated CAZAC code and the plurality of frequency-domain signals;
producing a noise and interference covariance matrix of correlation between the plurality of frequency-domain signals received at the plurality of antennas;
determining a noise power level of the channel based on the noise and interference covariance matrix;
determining the SNR associated with each user by dividing the associated measured signal power level by the determined noise power level.

16. The computer program product of claim 15, further comprising:
determining a Signal to Interference-plus-Noise Ratio (SINR) associated with each user by dividing the associated measured signal power level by a sum between the noise power level and the sum of the signal power level associated with the remaining users excluding the signal power level of the user under concern.

17. The computer program product of claim 15 wherein the noise and interference covariance matrix comprises:
diagonal elements which hold a combination of noise and interference power level received on each of the plurality of receiving antennas; and
off-diagonal elements which hold the interference power level received on all of the plurality of receiving antennas.

18. The computer program product of claim 15, further comprising:

determining the noise power level by a subtraction operation between the diagonal elements and the off-diagonal elements of the noise and interference covariance matrix.

19. The computer program product of claim 15 wherein the CAZAC code is a Zadoff-Chu sequence.

20. The computer program product of claim 15 wherein the channel is a LTE Physical Uplink Control Channel (PUCCH).

* * * * *